United States Patent Office

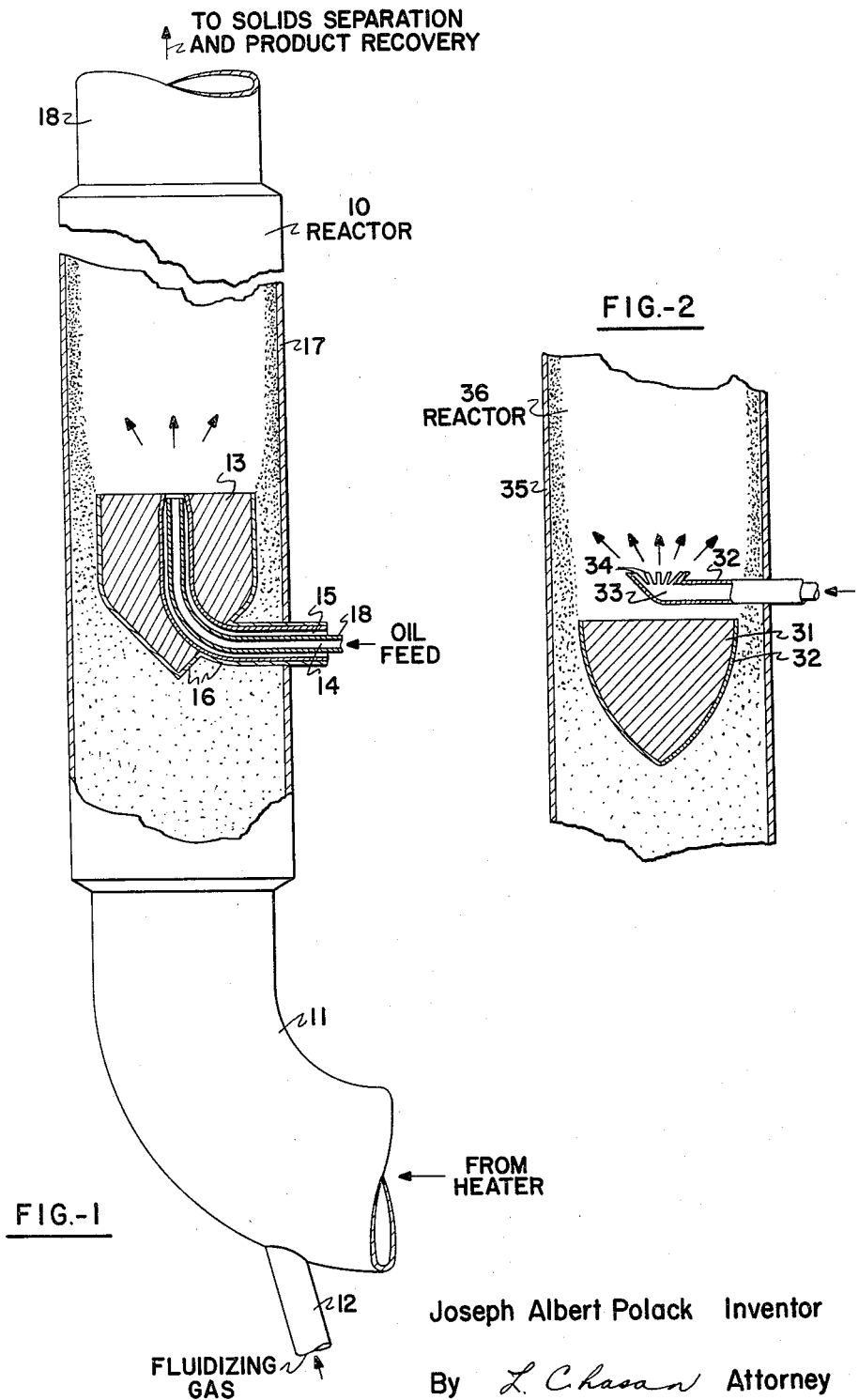
Joseph Albert Polack Inventor

2,937,988
Patented May 24, 1960

2,937,988

PREVENTION OF COKING ON WALLS OF TRANSFER LINE REACTOR

Joseph Albert Polack, Baton Rouge, La., assignor to Esso Research and Engineering Company, a corporation of Delaware Filed Mar. 19, 1957, Ser. No. 647,047

3 Claims. (Cl. 208—127)

The present invention relates to an improved disperse solids conversion process. More particularly, it is concerned with a method and apparatus for preventing the deposition of carbonaceous material on the walls of a transfer line reactor.

Thermal cracking of heavy hydrocarbon oils by introducing an oil feed into a rapidly moving stream of disperse solids is well known in the art. Upon contact with the hot, flowing solids, the suitably pre-heated oil is converted to lighter vaporous products and carbonaceous residue which deposits on the contact solids.

After separation of the gaseous reaction products from the coking effluent stream, normally at least a portion of the solids are sent to a burner wherein combustion of the deposited carbonaceous material serves to heat the particles. Requisite thermal energy for the conversion process is supplied by recirculating the solids thus heated to the coking zone.

The oil feed may be a heavy hydrocarbon residuum, vacuum, or atmospheric crude bottom, pitch, asphalt, etc. or mixtures thereof, and generally has an initial boiling point above about 700° F., an A.P.I. gravity of about 0° to 20°, and a Conradson carbon residue content of about 5 to 40 wt. percent. The hot contact solids, normally heated to a temperature of about 1200 to 1600° F., are preferably coke granules, although sand, ceramics, glass beads and the like may be alternatively employed.

Thermal cracking of heavy hydrocarbon oils in a relatively high velocity stream of dispersed solids presents particularly difficult problems with regards to the proper contact of oil feed and flowing particles. The solids, dispersed in a propellant gas, are flowing at velocities of about 10 to 100 ft. per second, thus permitting residence times of only 0.1 to 5.0 seconds. Since the solids density within the transfer line of the order of approximately 0.5 to 10 lbs. per cu. ft., the contact particles occupy a relatively small volume of the reactor. Furthermore, a transfer line vessel, characterized by its high length to diameter ratio, has a high proportion of inner wall surface area per unit volume of reaction zone (about 0.5 to 4 sq. ft./cu. ft.). Hence a considerable proportion of the hydrocarbon feed, rather than thermally reacting with the solid particles, comes in contact with the wall or walls of the reactor thus depositing carbonaceous residue on their surfaces. Carbonaceous deposits build up to sufficiently great levels to materially interfere with the free flow of the solids stream. Reactor shutdowns and expensive cleaning operations may be necessary for the removal of these undesirable coke formations. Moreover, oil coming in contact with the walls of the reactor is not subjected to proper thermal cracking conditions, and hence is not converted to the desired products of the high temperature oil-solids pyrolysis reaction.

The present invention sets forth a method and apparatus for promoting the contact of oil feed with flowing solids while preventing the deposition of carbonaceous material on the walls of the coking reactor. More particularly, according to the present invention, the flowing solids stream is deflected outwardly, thus concentrating the solid particles along the boundary or boundaries of the reaction zone. The wall surface or surfaces, shielded by a blanket of solids, are protected from deposition of carbonaceous material which normally results from contact with the oil feed. Hydrocarbon oil, preferably introduced into the reactor at one or more points substantially equidistant from the walls of the reactor, contacts essentially only the high temperature particulate solids and is thereby efficiently thermally cracked to give valuable, light vaporous hydrocarbon products.

The present invention will be more clearly understood by referring to the following description, drawings, and accompanying example.

Figure 1 illustrates a transfer line reactor employing a single structure for effecting both solids deflection and oil injection.

Figure 2 depicts an alternative embodiment wherein solids flow is diverged and oil feed introduced by independent means.

With reference to Figure 1, there is shown an elongated conduit type reaction zone 10, normally referred to as a transfer line reactor. Coke particles, ranging in size from 0 to 1000 microns and at a temperature of about 1600° F., are admitted into the lower portion of the reactor through conduit 11 as a disperse stream of solids. Fluidizing gases, such as steam, light hydrocarbons, an inert gas, or mixtures thereof, are injected into riser conduit 11 by line 12 at a temperature of 350° F., and serve to propel the contact solids upwardly through the reactor in the form of a solids-gas dispersion. The hot contact solids are normally supplied from a burner vessel, not shown, preferably either of the transfer line or dense fluid bed types. As is well known in the art, carbon-coated reaction solids, separated from the vaporous effluent of the coking reactor, are circulated to a burner zone wherein they are partially combusted to a temperature 100° to 400° higher than the thermal cracking temperature. These solids are then recirculated to the conversion zone to supply the requisite high temperature surfaces for the pyrolysis of the oil feed. A portion of the circulating solids is withdrawn, either continuously or intermittently, as product, finding use as boiler fuel feed or being further processed for other applications.

In accordance with the present invention, oil-solids distributor 13 is positioned in the central portion of the transfer line reactor, preferably in the lower portion thereof. The general shape of the distributor, cylindrical with an inverted conical lower section, is designed to deflect the solids stream from its normal path and force the solids outwardly towards the wall 17 of the reactor. Oil feed inlet passageway 14, centrally located within distributor 13, terminates in an injection opening substantially equidistant from the walls of the reactor. Hydrocarbon oil, such as a 2.4% South Louisiana residuum, is preheated to a temperature of about 500° F. and introduced into the reactor at an overall rate of 10,000 bbls. per day. Steam at a temperature of 350° F. flows through cooling jacket 15 encompassing oil passageway 14. The extremity of jacket 15 is preferably tapered so as to pass the steam as a plurality of jets transversely across the oil flow, thus shearing and atomizing the oil into fine droplets as it is introduced into the reaction zone. While the drawing illustrates a shear jet method of oil dispersion, other oil injection means are to be understood as falling within the spirit of the present invention. For example, passageway 14 could terminate as a spray outlet, one or more nozzle fingers, or other conventional injection means well known in the art. Similarly, steam jacket 15 may be entirely eliminated, or merely constructed to prevent entrance of the steam into the reaction zone.

It is normally advantageous to employ an erosion resistant material 16, such as silicon carbide or the like, as lining for the exposed surfaces of the deflector and feed inlet line 18, thus minimizing wearing away of structural members within the path of the high velocity solids. It should further be noted that inlet 18 occupies a relatively small proportion of the reactor cross-sectional area, and hence has little effect in diverting solids flow.

Distributor 13 is centrally positioned with regards to the 4.5 ft. reactor diameter. Its cylindrical section, 3.2 ft. in diameter and having a length of about 2 ft., defines an annular solids passageway of approximately 8 inches in width. More concisely put, distributor 13 halves the total free cross-sectional area of the reactor into a substantially uniform, continuous, annular passageway. Of course, the present invention is not to be construed as limited to the particular dimensional or geometrical relationships enumerated above.

The disperse stream of solids, flowing upwardly at a velocity of about 30 ft. per second and having a density of 10 lbs. per cu. ft., is thus deflected from its upward path and concentrated along the wall 17 of the coking reactor. The solids density is increased to about 20 lbs. per cu. ft. in the annular area surrounding the deflector and continues to blanket the surface of the reactor walls for a substantial distance, generally at least about 8 ft. above the point of oil feed injection. In addition to shielding the wall from contact with oil feed, the solids have a scouring effect which readily removes any deposited material.

Oil is thus contacted with essentially only the coke particles, and converted at reaction temperatures in the neighborhood of 1400° F. to relatively light vaporous products. The high temperature pyrolysis of the oil yields substantial quantities of olefins and diolefins useful as intermediates in chemicals production.

The total reaction stream passes upwardly and is withdrawn overhead through line 18. After passing through a gas-solids separation zone, not shown, vaporous material is normally then subjected to product recovery treatment, such as scrubbing, fractionation, crystallization, etc. and the separated solids generally fed to a burner zone, as has been previously described.

Figure 2 shows the section of elongated reactor 36 in the general area of flow diverting structure 31. The drawing illustrates that the means for introducing the oil feed need not be an integral part of flow diverting structure 31. While an inverted hyperbolically shaped structure is depicted, other flow deflecting means such as an inverted cone may be alternatively utilized. Oil is fed through conduit 33 into the area above the deflector and dispersed as a fine mist by means of multiple discharge nozzles 34. It may be desirable, under certain conditions of operation, to introduce the oil at a level with structure 31. Both the deflector and feed inlet means are advantageously lined with an erosion resistant material 32 as in Figure 1. Upflowing solids, concentrated along reaction walls 35, serve to receive the oil feed and shield the walls from contact with hydrocarbons.

The following table, with reference to the drawings presents a summary of pertinent conditions relating to the systems described.

*Table I*

|  | Broad Range | Preferred Range |
| --- | --- | --- |
| Average solids size, microns | 0–1,000 | 100–300 |
| Solids temperature, °F | 900–1,800 | 1,200–1,600 |
| Solids density before deflector, lbs. per cu. ft. | 0.5–15 | 3–10 |
| Solids density in annulus, lbs. per cu. ft. | 1–30 | 6–20 |
| Ratio of annular area to reactor free cross-sectional area | 0.2–0.8 | 0.4–0.6 |

The present invention is not limited to use in conjunction with a vertical reactor, nor to the upward flow of reactor solids. Additionally, the concept of a protective solids blanket for reactor walls may find application in a catalytic or semi-catalytic conversion system.

By concentrating solids along the boundaries of the conversion zone, contact between oil feed and reactor walls is prevented. Flowing solids serve to effectively pyrolyze the heavy hydrocarbon oil to lighter products with a minimum of coke deposition on the walls of the conversion zone.

Having described the present invention, what is sought to be protected by Letters Patents is:

1. A thermal cracking process for converting hydrocarbon oil to lower boiling hydrocarbons and coke, which comprises passing upwardly through a high length to diameter ratio transfer line reaction zone a disperse stream of hot inert particulate solids at a velocity between about 10 and 100 ft./sec. and having a density between about 0.5 and 15 lbs. per cu. ft., then deflecting the flow of said stream outwardly to form an annulus of upwardly flowing solids and to concentrate solids along the inner wall of said transfer line reaction zone and so substantially increasing the density of said stream to between about 1 and 30 lbs. per cu. ft. while blanketing and protecting the inner wall of said transfer line reaction zone from contact with the oil feed and while continuing the upward flow of said stream, thereafter and downstream of said solids concentrating step injecting preheated oil feed from a central region of said transfer line reaction zone outwardly into the upwardly moving annulus of more concentrated upwardly flowing solids to contact said solids and to convert the oil feed into lighter vaporous products and carbonaceous residue while minimizing contact between said oil feed and the inner wall of said transfer line reaction zone so as to substantially prevent deposition of carbonaceous material on said inner wall as said stream flows upwardly, removing solids and vaporous reaction products overhead from said transfer line reaction zone and recovering vaporous reaction products from solids.

2. The process of claim 1 wherein said contact solids are inert particles ranging in size from 0 to 1000 microns and maintained at a temperature of about 1200 to 1600° F.

3. The process of claim 1 wherein said solids stream is deflected so as to increase the solids concentration along the boundaries of said reaction zone to about twice that of an undiverted solids stream.

References Cited in the file of this patent

UNITED STATES PATENTS

| | | |
| --- | --- | --- |
| 2,445,328 | Keith | July 20, 1948 |
| 2,606,144 | Leffer | Aug. 5, 1952 |
| 2,665,976 | Rhys | Jan. 12, 1954 |
| 2,687,992 | Leffer | Aug. 31, 1954 |
| 2,733,105 | Williams | Jan. 31, 1956 |
| 2,735,804 | Boston et al. | Feb. 21, 1956 |
| 2,759,880 | Brown | Aug. 21, 1956 |